United States Patent [19]

Beebe

[11] Patent Number: 4,704,900

[45] Date of Patent: Nov. 10, 1987

[54] APPARATUS AND METHOD FOR IMPOSING A DESIRED AVERAGE RADIAL FORCE ON A TIRE

[75] Inventor: James C. Beebe, Medina, Ohio

[73] Assignee: Eagle-Picher Industries, Inc., Cincinnati, Ohio

[21] Appl. No.: 897,924

[22] Filed: Aug. 19, 1986

[51] Int. Cl.$^4$ .......................................... G01M 17/02
[52] U.S. Cl. ..................................................... 73/146
[58] Field of Search ................................. 73/146, 8, 9

[56] References Cited

U.S. PATENT DOCUMENTS

| | | | |
|---|---|---|---|
| 4,078,339 | 3/1978 | Ongaro | 73/146 |
| 4,404,848 | 9/1983 | Iwama et al. | 73/146 |
| 4,404,849 | 9/1983 | Iwama et al. | 73/146 |

FOREIGN PATENT DOCUMENTS

| | | | |
|---|---|---|---|
| 2614852 | 10/1977 | Fed. Rep. of Germany | 73/146 |
| 0051601 | 4/1977 | Japan | 73/146 |

Primary Examiner—Donald O. Woodiel
Attorney, Agent, or Firm—Wood, Herron & Evans

[57] ABSTRACT

An apparatus and method for imposing a desired average radial load force on a tire by calculating the current average force between the tire and a loadwheel based on the average radial force and radial distance between the tire and a loadwheel over the last previous complete revolution of the tire, the spring constant of the tire and the current radial distance between the tire and the loadwheel. The calculated average force value is applied as a feedback signal to the loadwheel position controller in order to achieve the desired average radial load. The spring constant of the tire may be determined from the change in force per unit distance as the tire is loaded or programmed as a constant to be applied for testing all tires of a given type.

8 Claims, 1 Drawing Figure

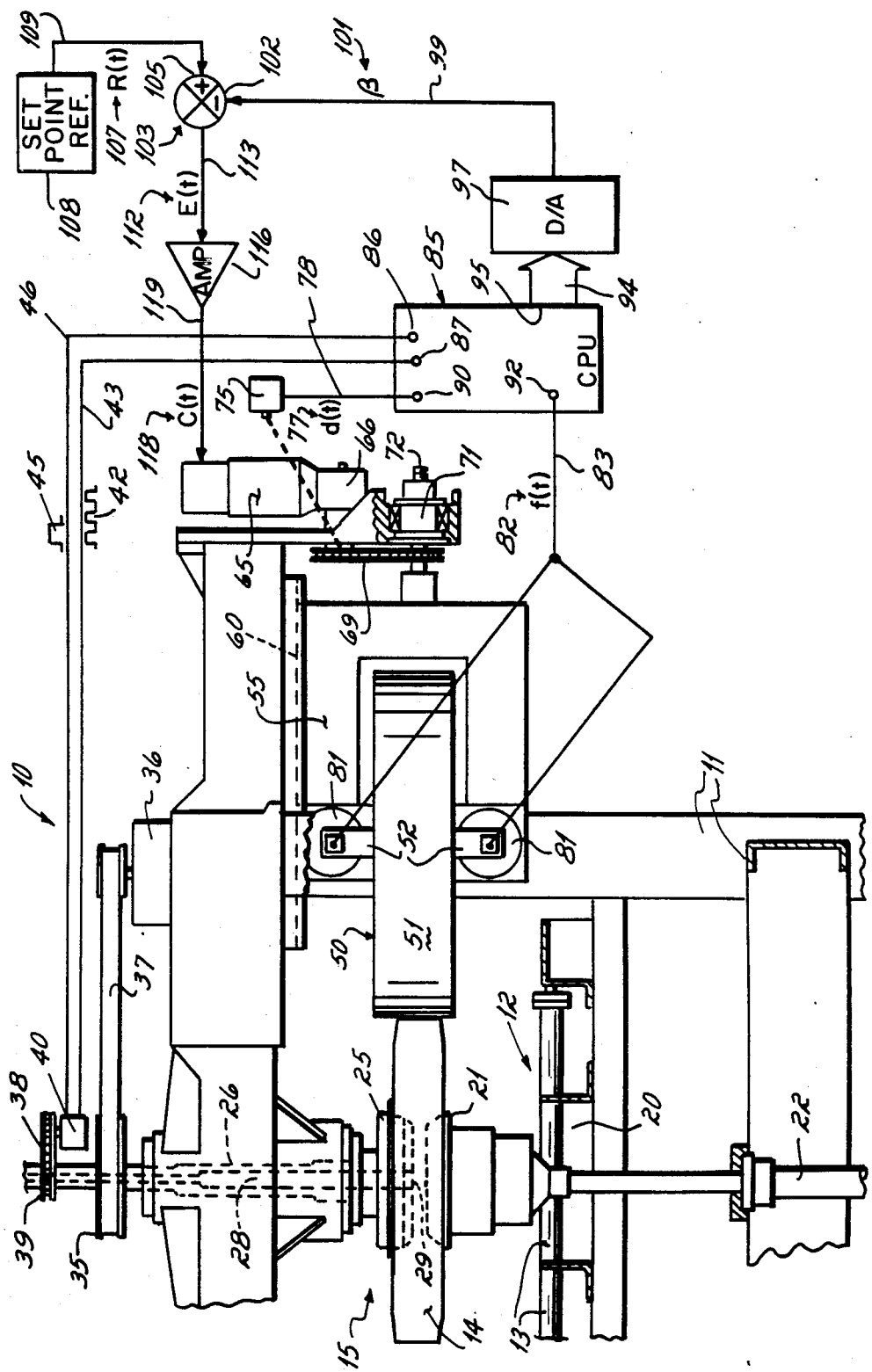

APPARATUS AND METHOD FOR IMPOSING A DESIRED AVERAGE RADIAL FORCE ON A TIRE

FIELD OF THE INVENTION

The present invention relates to tire testing. In particular, the invention relates to an apparatus and method for accurately and rapidly imposing a desired average radial load force on a tire to establish a desired test condition.

BACKGROUND OF THE INVENTION

A tire uniformity inspection machine is used to make measurements which characterize the uniformity of construction of a tire. This is accomplished by measuring the nature of certain reaction forces generated by the tire as it rolls under load along a surface.

In a typical tire uniformity inspection machine, testing is fully automatic. Tires are fed by conveyor to a test stations where each tire is mounted upon a chuck, inflated and rotatably driven with its tread surface in forced contact with the circumferential surface of a loadwheel. The loadwheel is mounted on a spindle to rotate freely about a vertical axis lying parallel to the axis of rotation of the tire. The loadwheel spindle is instrumented with load cells which measure forces acting on the loadwheel in directions of interest. Both the loadwheel and its spindle are mounted on a slidable carriage which is driven in the radial direction by a servomechanism. The servomechanism positions the carriage according to a feedback signal derived from the instantaneous force signals generated by the load cells on the loadwheel spindle in order to reach a specified average radial load setpoint.

To make data taken from a population of tires meaningful for comparison, it is necessary to insure that each tire is tested under substantially the same conditions. For instance, before measurements can be taken, the tire under test must be loaded with a specified average radial force. Radial force is measured along the direction between the center of the tire and the closest point on the rolling surface. The instantaneous radial force indicated by the load cells varies as a periodic function with the rotational position of the tire. The term "average radial force" refers to the average of the instantaneous radial force measured over one or more complete revolutions of the tire. To minimize the length of the overall test cycle and hence, the cost of testing, it is desirable to accurately bring the tire under test to the specified average radial load as rapidly as possible.

The difficulty in arriving at the average radial load setpoint rapidly arises from the fact that the instantaneous radial force exerted by the tire upon the loadwheel varies with the rotational position of the tire. If the servomechanism which positions the loadwheel uses a feedback signal emanating directly from the loadcells, the system will tend to seek the current instantaneous radial force rather than average radial force as desired. What is required is a feedback signal correlated to the average radial load rather than the instantaneous load. However, if the feedback signal is filtered to cause the servo to respond to the average radial force, a filter having a relatively long time constant is required. The time delay introduced by the filter requires the system to be operated at low gain in order to avoid oscillation. This gain limitation in turn limits the speed with which the desired average radial load can be achieved.

Accordingly, it is an object of the present invention to provide an apparatus and method for accurately and rapidly imposing a predetermined average radial load force on a tire in a way which does not require a filter having a long time constant in the feedback loop. It is a further object of the invention to provide such an apparatus and method which operates according to a feedback signal representative of the calculated average radial load on tire at the current radial distance between the tire and the loadwheel.

SUMMARY OF THE INVENTION

The present invention provides an apparatus and method for accurately and rapidly imposing a desired average radial force on a tire whereby the servomechanism which drives the loadwheel carriage to load the tire operates according to a feedback signal correlated to a calculated value representing the current average radial force.

The feedback signal is generated by a central processing unit which keeps running averages of both the instantaneous radial force and instantaneous radial distance measured over the last complete revolution of the tire. The average radial force at the current radial distance between the tire and the loadwheel is calculated as the sum of the average force over the last revolution of the tire and a term equal to the product of the spring constant of the tire and the difference between the average radial distance over the last revolution of the tire and the current radial distance. The spring rate of each tire can be calculated as the tire is being loaded based on a measured change in radial force for a corresponding change in radial distance. Alternatively, a known spring rate for the type of tire under test can be used.

BRIEF DESCRIPTION OF THE DRAWINGS

The Fig. is a schematic side elevational view of a portion of a tire uniformity inspection machine embodying the invention and showing a tire in the test position.

DESCRIPTION OF THE PREFERRED EMBODIMENT

As shown, the tire uniformity inspection machine 10 of the invention includes a frame 11 which supports a conveyor 12 having a plurality of rollers 13 for delivering a tire 14 to be inspected to a test station 15. Conveyor 12 includes an opening 20 which is small enough to prevent a tire from falling through but large enough to pass a lower half chuck 21 which is rotatably mounted upon a vertically retractable lower tire spindle 22. An upper half chuck 25 is rotatably mounted by means of an upper tire spindle 26 to the upper portion of frame 11. Upper half chuck 25 is disposed opposite lower half chuck 21 so that upper and lower chucks 21 and 25 cooperate to function as a rim to support a tire 14 under test when lower half chuck 21 is in its extended position as shown. Upper tire spindle 26 includes an axial air passage 28 which communicates with an orifice 29 in upper half chuck 25 to permit inflation of tire 14.

In order to rotate a tire under test, upper tire spindle 26 is fitted with a drive pulley 35 connected to a drive motor 36 by way of a timing belt 37. A rotary shaft encoder 40 is connected by chain 38 and sprocket 39 or a belt and pulley to rotate with upper tire spindle 26. Shaft encoder 40 produces a series of 128 nominally equally angularly spaced rotation pulses 42 on line 43 and a single position reference voltage pulse 45 on line 46 for each rotation of tire 14. Position reference pulse 45 is centered about a particular one of the rotation pulses 42 so that each rotation pulse 42 specifies a particular rotational position of tire 14 which can be identified according to its position with respect to position reference pulse 45.

A loadwheel 50 having a circumferential surface 51 is supported by loadwheel spindles 52 for free rotation about an axis parallel to that of the tire 14 under test. Loadwheel spindles 52 are in turn supported by a carriage 55 which is slidably secured to frame 11 by one or more ways 60 as to be moveable in the radial direction, toward and away from tire 14. As carriage 55 urges loadwheel 50 radially inward (to the left in the Fig.) against tire 14, the radial load on tire 14 increases. Likewise, movement of carriage 55 radially outward (to the right in the Fig.) reduces the radial force on tire 14. Carriage 55 is moved back and forth by a reversible D.C. motor 65 secured to frame 11. Motor 65 drives a gear box 66 whose output drives a chain and sprocket linkage 69 to rotate a ball screw rotation only female screw 71. A screw shaft 72 fixed to carriage 55 is received within female screw 71 in order to translate carriage 55 in the radial direction as female screw 71 rotates. A potentiometer 75 is connected to the output of gear box 66 to generate a radial distance signal, d(t) 77 correlated to the instantaneous radial distance between the center of the tire 14 under test and the circumferential surface 51 of loadwheel 50.

Distance signal 77 appears on line 78. Loadwheel 50 is instrumented with a pair of load cells 81, one of which is mounted upon each loadwheel spindle 52. Load cells 81 are wired in parallel with one another to generate a force signal, f(t) 82 on line 83 which is correlated to the instantaneous radial force transmitted by the tire 14 under test to loadwheel 50.

A central processing unit (CPU) 85, the operation of which will be described in further detail below, includes encoder input ports 86 and 87 which receive position reference pulses 45 and rotation pulses 42 respectively by way of lines 46 and 43 from shaft encoder 40. CPU 85 further includes a first analog input port 90 which receives radial distance signal, d(t) from potentiometer 75 by way of line 78 and a second analog input port 92 which receives force signal f(t) from loadcells 81 by way of line 83. CPU 85 generates a digital output signal 94 which appears at output port 95 and is processed by a digital to analog converter (D/A) 97 to generate on line 99, a feedback signal, β101. Feedback signal 101 is received by the minus input 102 of a summing junction 103. Summing junction 103 also includes a plus input 105 which receives a set point reference signal, R(t) 107 from set point reference 108 by way of line 109. Set point signal 107 is selected to represent the desired average radial force to be established between tire 14 and loadwheel 50. Summing junction 103 sums feedback signal 101 and reference signal 107 to generate an error signal, E(t) 112 on line 113 which is received by an amplifier 116 which multiplies error signal 112 by a gain factor to generate a control signal, C(t) 118 on line 119. Control signal 118 is received on line 119 by the driving circuitry associated with motor 65.

In operation, carriage 55 loadwheel 50 is initially retracted. A tire 14 to be inspected is carried by conveyor 12 to test station 15. Lower half chuck 21 is then extended, elevating tire 14 into test position so that tire is 14 is clamped between lower half chuck 21 and rotating upper half chuck 25. Tire 14 is inflated to a desired test pressure by flowing air under pressure through axial air passage 28 and orifice 29. Tire 14 rotates at a nominally constant angular speed according to the rotation of drive motor 36.

CPU 85 then causes carriage 55 to be driven radially inward, causing loadwheel 50 to move toward tire 14. As the circumferential surface 51 of loadwheel 50 engages the tread surface of tire 14, loadwheel 50 begins to rotate due to its engagement with tire 14. Once steady state rotation of loadwheel 50 is established, CPU 85 proceeds to determine the spring constant, k of tire 14. This is accomplished by measuring the change in radial force over a change in radial distance as carriage 55 moves radially inward and by calculating the spring constant, k as the quotient of the change in radial force divided by the corresponding change in radial distance.

To calculate the spring constant, k of tire 14, CPU 85 polls encoder reference input port 86, testing for the presence of a position reference pulse 42 there. When the next rotation pulse 42 appears at the encoder rotation input port 87 on line 43, CPU 85 reads and stores data representing both the instantaneous radial distance signal, d(t) 77, appearing at first analog input port 90 and the instantaneous radial force signal, f(t) 82 appearing at second analog input port 92. This procedure is repeated for the next 127 rotation pulses 42 so that CPU 85 holds in memory corresponding sets f(n), r(n) (where n=1 to 128) of radial force and distance information sampled at 128 points over one full revolution of tire 14.

CPU 85 then calculates and stores in memory the value of the spring constant, k of tire 14 according to:

$$k = |f(128) - f(1)| / |d(128) - d(1)| \qquad \text{Eq. 1}$$

While it is desirable to determine the spring constant of each tire as just described, these steps may be omitted where the spring constant k, is made available to CPU 85 by other means for use in subsequent calculations by other means. For example, an appropriate spring constant, k for the type of tire under test can be determined by experiment and stored in the memory of CPU 85 as a constant for all tires of a given type.

After the first complete rotation of tire 14 during which data is taken, CPU 85 continues to sample force and radius data at intervals determined by the occurrence of rotational pulses 42. After 128 sets of data have been taken, CPU 85 updates its data memory on a last in-first out (LIFO) basis so that the memory of CPU 85 thereafter contains force and radius data representing the last complete revolution of tire 14. The average radial force, $F_{AVG}$ over the last full rotation of tire 14 is calculated by CPU 85 by adding each of the 128 stored force measurements stored in memory and dividing the sum by 128. Likewise, the average radial distance $D_{AVG}$, over the last rotation is calculated by CPU 85 by adding each of the 128 radius measurements stored in memory and dividing the sum by 128. $F_{AVG}$ and $D_{AVG}$ are both updated and stored by CPU 85 each time the contents of the data memory are updated.

Carriage 55 continues to move radially inward toward tire 14 until the instantaneous force signal, f(t) 82 appearing at second analog input port 92 approaches the desired average force represented by reference signal R(t), 107. CPU 85 then calculates the average radial force, $F_{CALC}$ at the current radial position of loadwheel 50 according to:

$$F_{CALC} = F_{AVG} + k(d_{current} - D_{AVG}) \qquad \text{Eq. 2}$$

where:

$F_{AVG}$ is the average radial force over the last complete revolution of tire 14;

k is the spring constant of the tire;

d current is the current sampled value of radial distance signal d(t) and $D_{AVG}$ is the average radial distance between tire 14 and loadwheel 50 over the last complete revolution of tire 14.

CPU 85 then writes the calculated value $F_{CALC}$, as a digital output signal 94 to output port 95. D/A 97 receives digital output signal 94 and generates a corresponding analog feedback signal, β101 which is applied to the minus input 102 of summing junction 103. Summing junction 103 generates an error signal, E(t) 112 based on the difference between the desired average radial load represented by set point reference signal R(t) 107 and the calculated average radial load, $F_{CALC}$ as represented by feedback signal, β101. Error signal E(t) 112 is amplified by amp 116 to yield control signal, C(t) 118 which drives motor 65 to adjust the position of carriage 55 in accordance with the magnitude and algebraic sign of the error signal E(t) 112. The servomechanism operates to reduce error signal, E(t) 112 toward zero by adjusting the radial position of loadwheel 50 to establish an average radial force load on tire 14 in accordance with set point reference signal, R(t) 107.

While the apparatus and method described herein constitute a preferred embodiment of the invention it is to be understood that the invention is not limited thereby and that changes can be made therein without departing from the scope of the invention as defined by the appended claims.

I claim:

1. An apparatus for imposing a desired average radial force on a rotating tire, comprising:
    (a) a loadwheel;
    (b) means for urging said loadwheel and said tire into radial contact with one another;
    (c) means for measuring both the radial force and the radial distance between the tire and the loadwheel at a plurality of rotational positions of the tire;
    (d) means for calculating an average radial force, $F_{AVG}$ as the arithmetic average of said measured force values;
    (e) means for calculating an average radial distance, $D_{AVG}$ as the arithmetic average of said measured radial distance values;
    (f) means for calculating the average radial load $F_{CALC}$ on the tire according to the equation $$F_{CALC} = F_{AVG} + k(d_{current} - D_{AVG})$$

where:
    k is the spring constant of the tire and
    $d_{current}$ is the current radial distance between the tire and the loadwheel
    and
    (g) means responsive to a signal correlated to said calculated average radial load, $F_{CALC}$ to adjust the radial distance between the tire and said loadwheel to control the average radial load at a desired value.

2. The apparatus of claim 1 further comprising means for determining the spring constant of the tire.

3. The apparatus of claim 2 wherein said means for determining the spring constant, k of the tire comprises:
    (a) means for measuring an initial radial force between the tire and said loadwheel and a corresponding initial radial distance between the tire and said loadwheel at one rotational position of the tire;
    (b) means for varying the radial distance between the tire and said loadwheel;
    (c) means for measuring at a second rotational position of the tire, a subsequent radial force between the tire and said loadwheel and a corresponding subsequent radial distance between the tire and said loadwheel and
    (d) means for calculating the spring constant, k of the tire as a quotient whose dividend is the absolute value of the difference between said initial radial force and said subsequent radial force and whose divisor is the absolute value of the difference between said initial radial distance and said subsequent radial distance.

4. The apparatus of claim 3 wherein said second rotational position of the tire is substantially the same as said first rotational position of the tire.

5. A method of imposing a desired average radial force on a rotating tire using a loadwheel, comprising the steps of:
    (a) urging the circumferential surface of the loadwheel into radial contact with the tread surface of the tire;
    (b) measuring both the radial force and the radial distance between the tire and said loadwheel at a plurality of nominally equally angularly spaced rotational position of the tire over a complete revolution of the tire;
    (c) calculating an average radial force, $F_{AVG}$ as the arithmetic average of said measured force values;
    (d) calculating an average radial distance, $D_{AVG}$ as the arithmetic average of said measured radial distance values;
    (e) calculating the average radial load, $F_{CALC}$ on the tire according to the equation $$F_{CALC} = F_{AVG} + k(d_{current} - D_{AVG})$$

where:
    k is the spring constant of the tire and
    $d_{current}$ is the current radial distance between the tire and the loadwheel
    and
    (f) applying a signal correlated to said calculated average radial load, $F_{CALC}$ as a feedback signal to a servomechanism responsive to adjust the radial distance between the tire and said loadwheel to control the average radial load at a desired value.

6. The method of claim 5 further comprising the step of determining the spring constant of the tire.

7. The method of claim 6 wherein said step of determining the spring constant k of the tire comprises the steps of:
    (a) measuring an initial radial force between the tire and said loadwheel and a corresponding initial radial distance between the tire and said loadwheel at one rotational position of the tire;
    (b) varying the radial distance between the tire and said loadwheel;
    (c) measuring at a second rotational position of the tire, a subsequent radial force between the tire and said loadwheel and a corresponding subsequent radial distance between the tire and said loadwheel and (d) calculating the spring constant, k of the tire as a quotient whose dividend is the absolute value of the difference between said initial radial force and said subsequent radial force and whose divisor is the absolute value of the difference between said initial radial distance and said subsequent radial distance.

8. The method of claim 7 wherein said second rotational position of the tire is substantially the same as said first rotational position of the tire.

UNITED STATES PATENT AND TRADEMARK OFFICE
CERTIFICATE OF CORRECTION

PATENT NO. :   4,704,900
DATED      :   November 10, 1987
INVENTOR(S) :  James C. Beebe It is certified that error appears in the above-identified patent and that said Letters Patent is hereby corrected as shown below:

At Col. 1, line 21, please rewrite "stations" as --station--.

Signed and Sealed this

Twenty-eighth Day of March, 1989

Attest:

DONALD J. QUIGG

Attesting Officer

Commissioner of Patents and Trademarks